LE ROY B. FRASER.
ENVELOP BLANK CUTTING MACHINERY.
APPLICATION FILED SEPT. 29, 1917. RENEWED MAY 24, 1920.
1,362,410.
Patented Dec. 14, 1920.
7 SHEETS—SHEET 6.
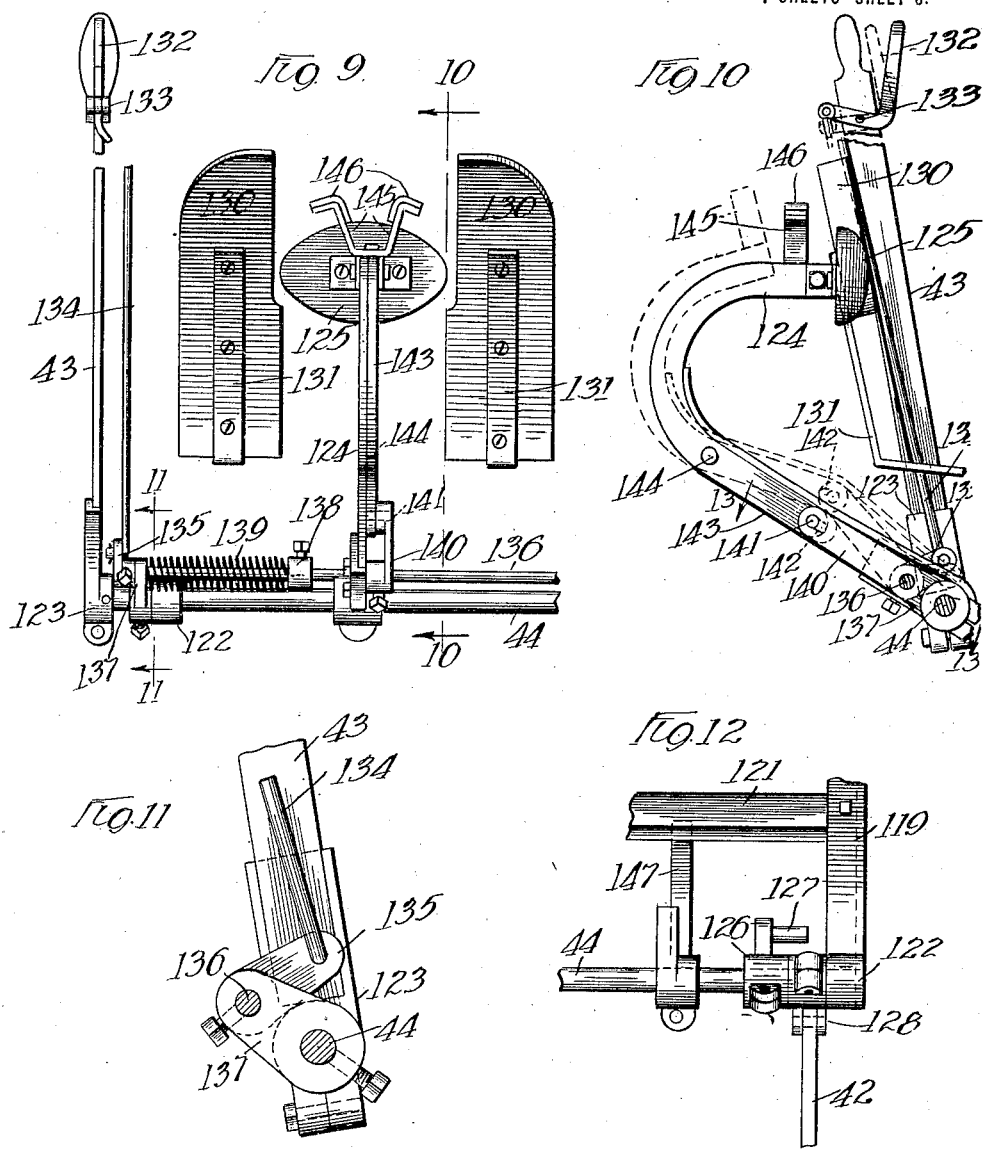
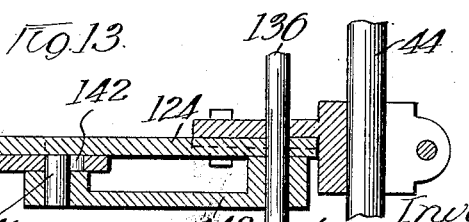

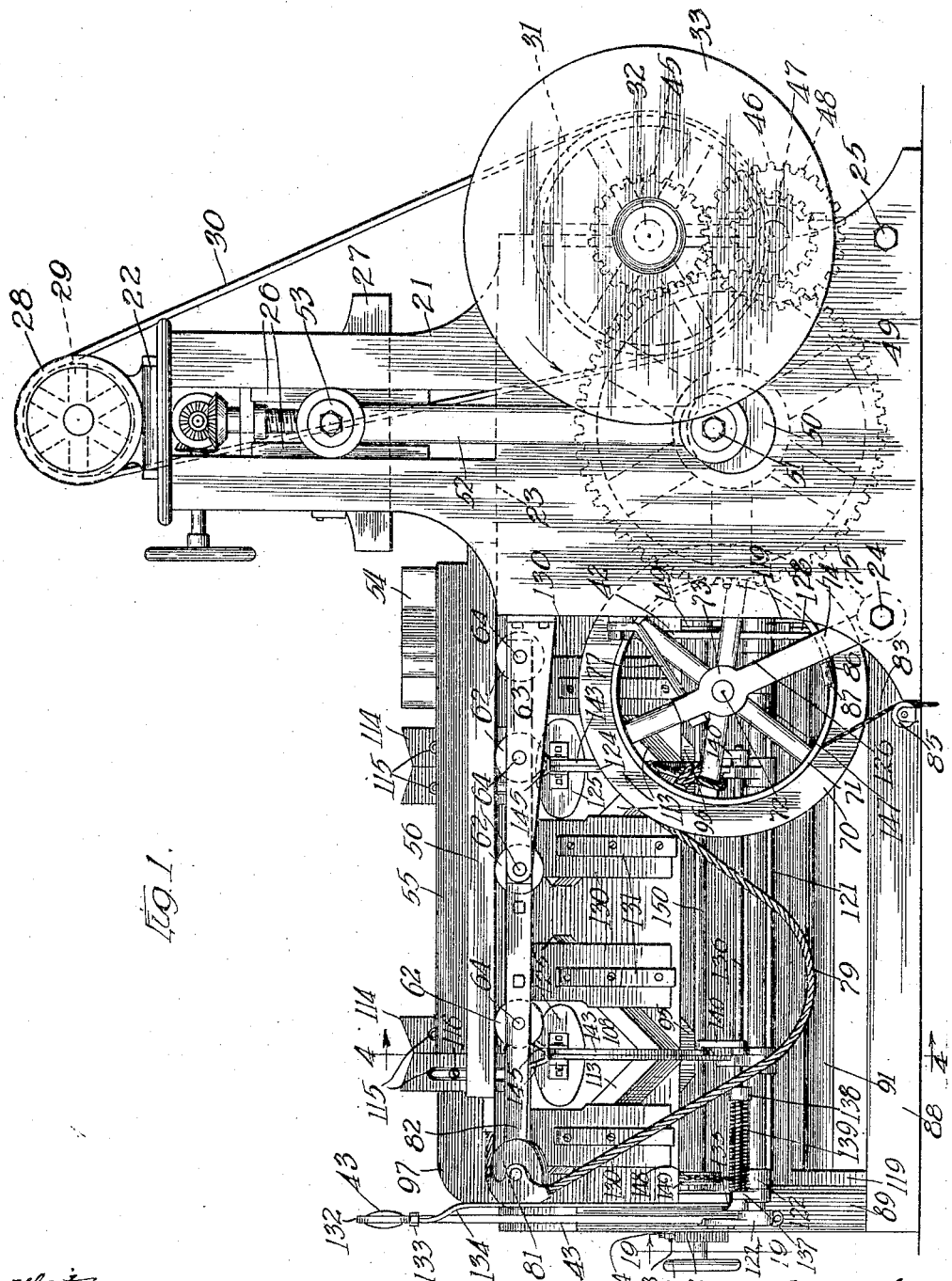

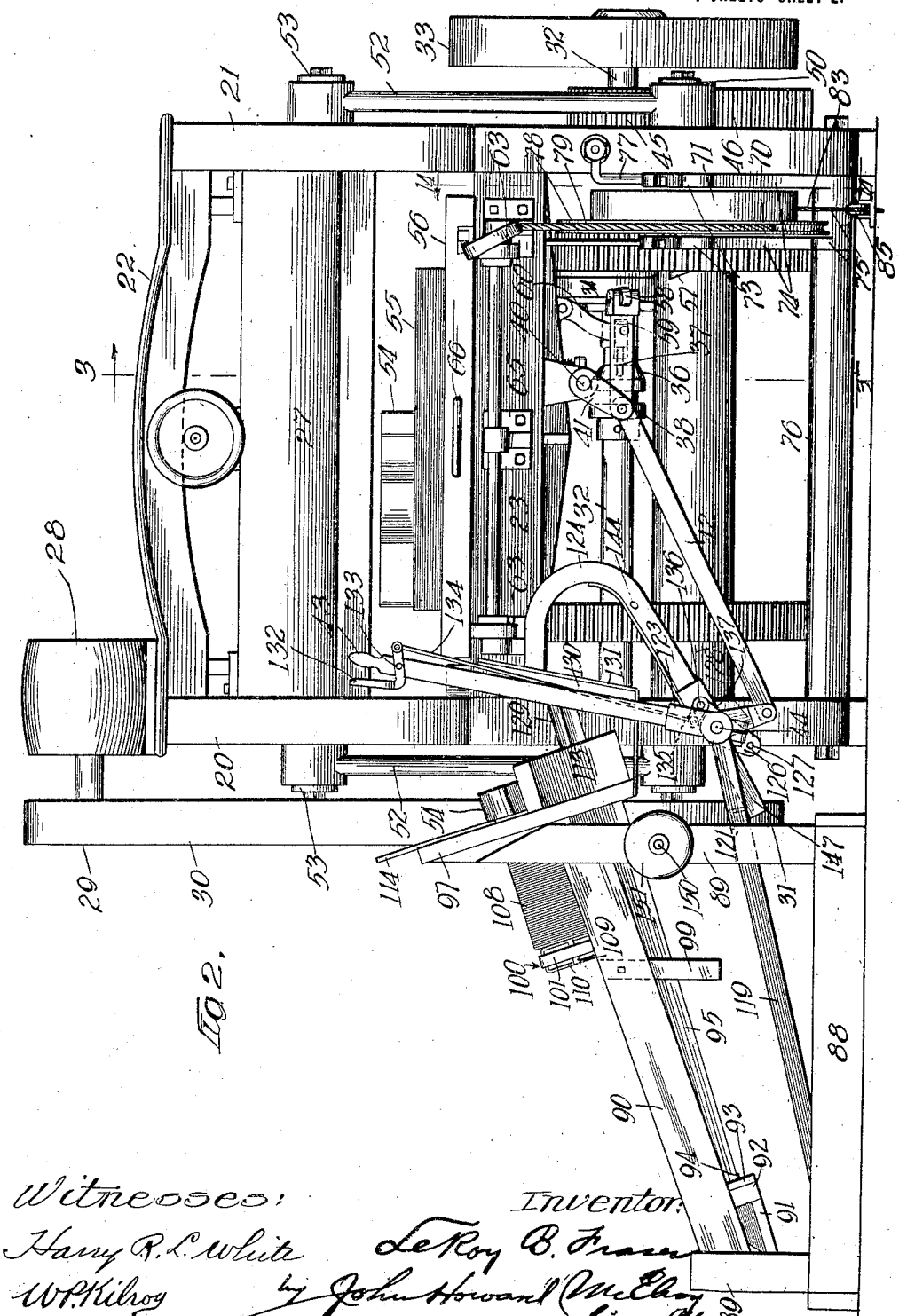

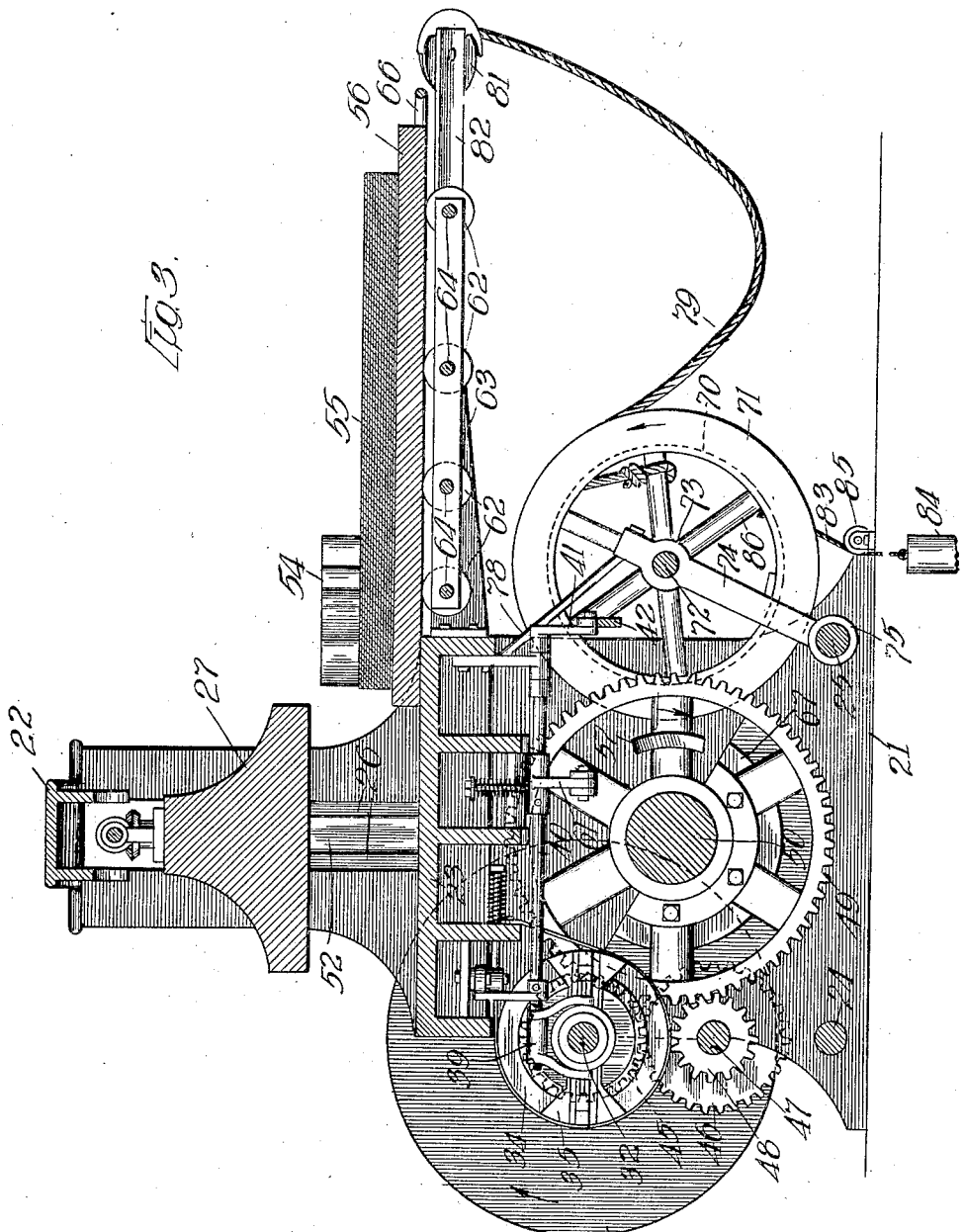

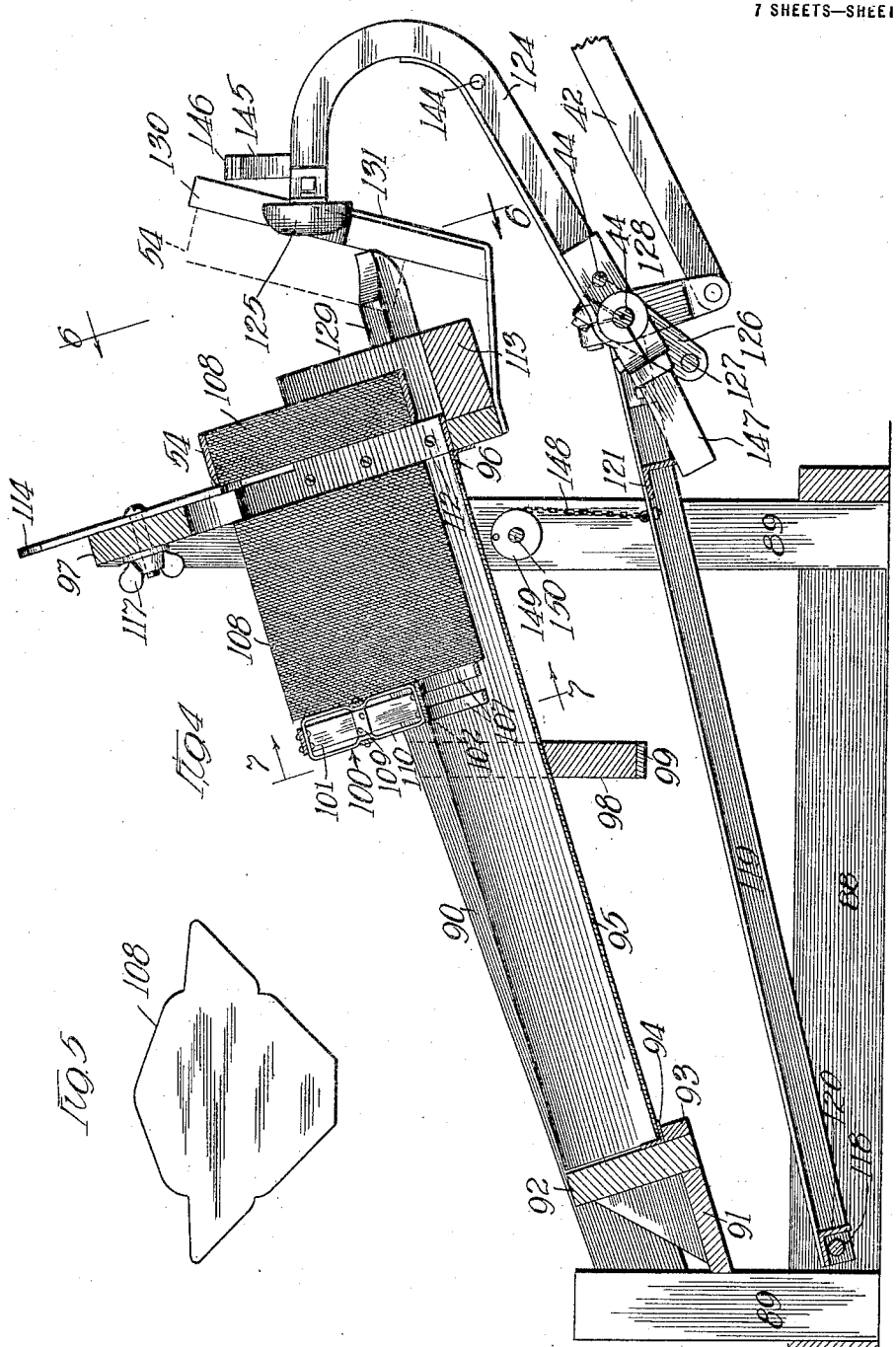

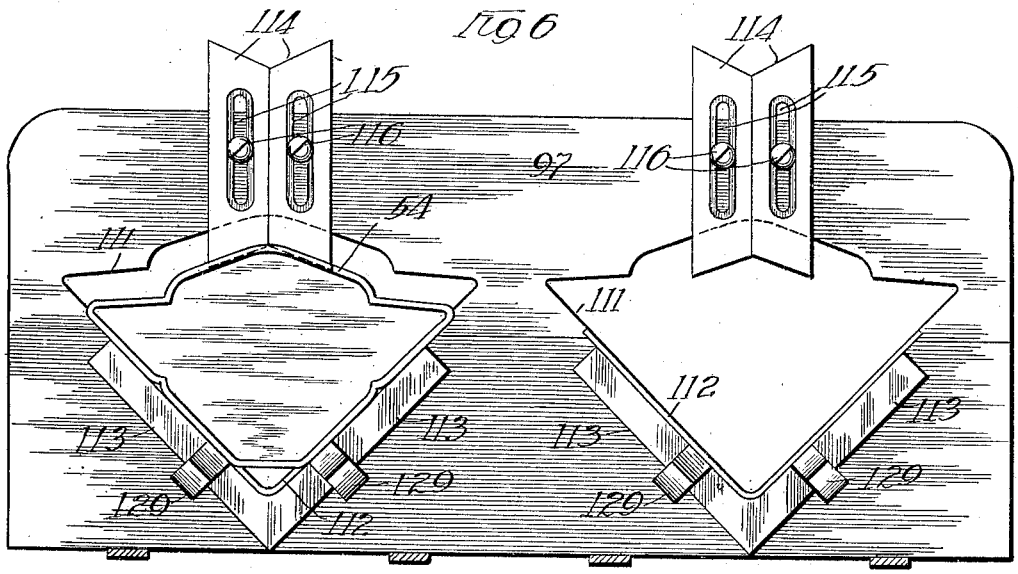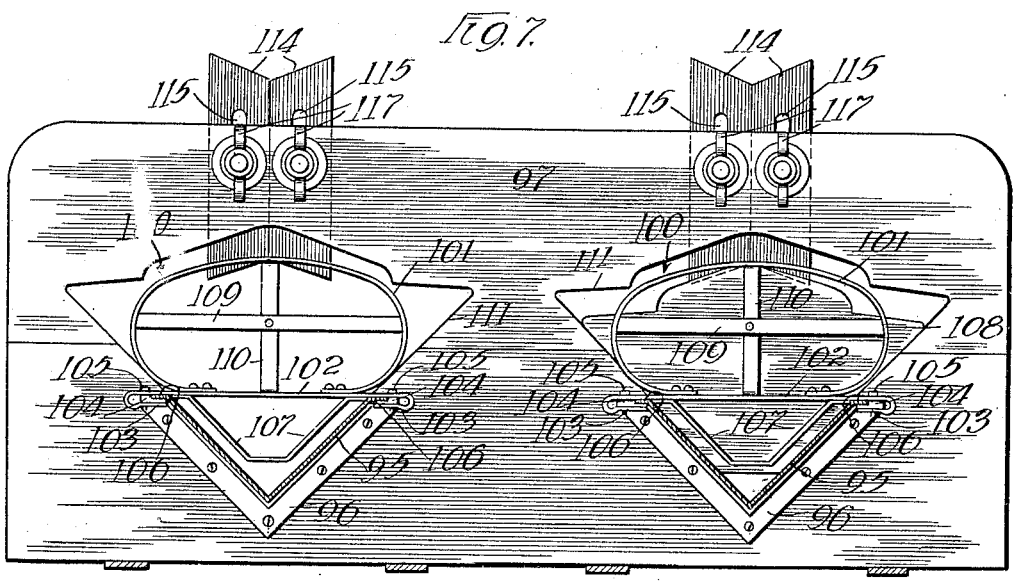

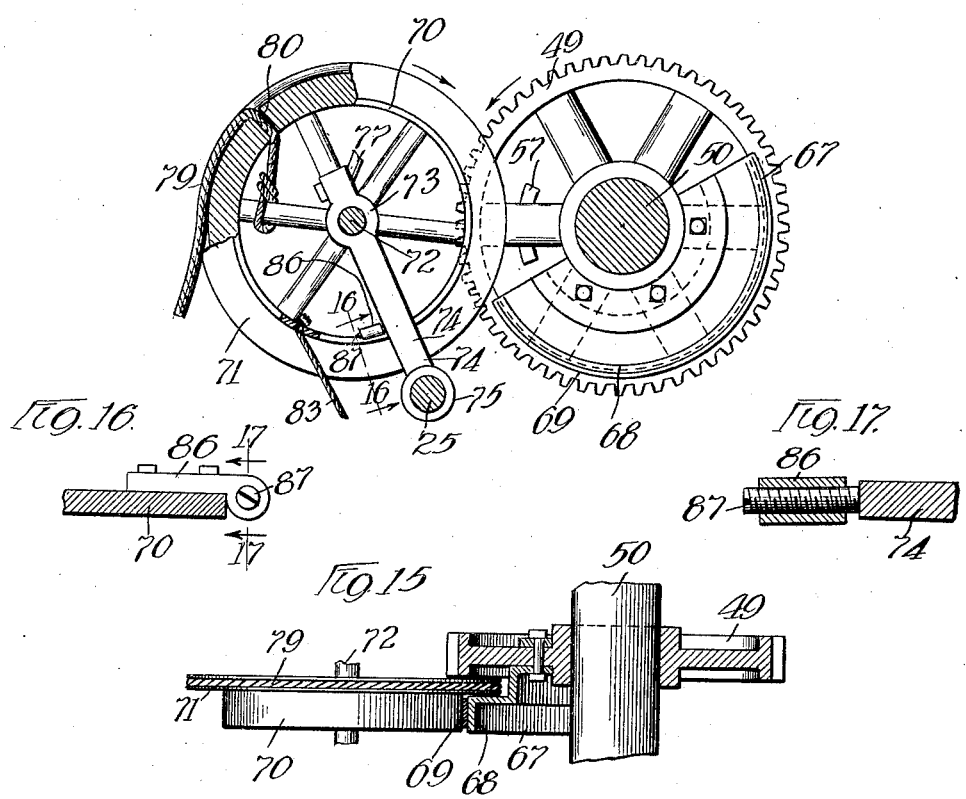

UNITED STATES PATENT OFFICE.

LE ROY B. FRASER, OF NEW HAVEN, CONNECTICUT, ASSIGNOR TO SEWELL-CLAPP-ENVELOPES, OF CHICAGO, ILLINOIS, A CORPORATION OF ILLINOIS.

ENVELOP-BLANK-CUTTING MACHINERY.

1,362,410.  Specification of Letters Patent.  Patented Dec. 14, 1920.

Application filed September 29, 1917, Serial No. 193,894. Renewed May 24, 1920. Serial No. 383,925.

*To all whom it may concern:*

Be it known that I, LE ROY B. FRASER, a citizen of the United States, and a resident of New Haven, in the county of New Haven and State of Connecticut, have invented certain new and useful Improvements in Envelop-Blank-Cutting Machinery, of which the following is a full, clear, and exact specification.

My invention is concerned with certain improvements in envelop-blank cutting machinery, and is designed to produce mechanism of the class described by which an operator can cut blanks faster and with less labor than has been possible heretofore.

To this end, it involves a blank-cutting press with a reciprocating table upon which the stock from which the blanks are to be cut is placed, and which is automatically returned to its loading position as soon as the cut is made.

To the same end, it comprises such a press in combination with a die-emptying device so connected thereto that as the operator starts the press to cut blanks by the depression of one die through the stock, another similar die is automatically emptied, so that when the table reaches its loading position, the empty die is ready to be substituted for the filled die, and the machine can be kept in continuous operation except for the time that it takes to remove the filled die and adjust the empty die on another place on the stock.

To illustrate my invention, I annex hereto seven sheets of drawings, in which the same reference characters are used to designate identical parts in all the figures, of which,—

Figure 1 is a side elevation of a press and associated mechanism embodying my invention;

Fig. 2 is an end elevation of the same;

Fig. 3 is a central vertical longitudinal section;

Fig. 4 is a section through the die-emptying device, on the line 4—4 of Fig. 1;

Fig. 5 is a view showing the form and size of envelop-blank for cutting which the machinery is adjusted;

Fig. 6 is a section through the die-emptying device, as seen from the line 6—6 of Fig. 4;

Fig. 7 is a similar view as seen in section on the line 7—7 of Fig. 4;

Fig. 8 is an enlarged detail in section, showing the frictional connections of the follower with the trough;

Fig. 9 is an end view of the die-emptying device as it is seen looking to the left from the center of Fig. 2;

Fig. 10 is a view in section on the line 10—10 of Fig. 9;

Fig. 11 is an enlarged detail in section on the line 11—11 of Fig. 9;

Fig. 12 is a top plan view showing the inner end of the rock shaft on which the die-emptying operating lever is located;

Fig. 13 is an enlarged detail in section on the line 13—13 of Fig. 10;

Fig. 14 is an end elevation, with parts broken away, of the table-returning friction-disk and its associated friction segment, as seen on the line 14—14 of Fig. 2;

Fig. 15 is a top plan view of the friction disk and its coöperating friction segment, shown in Fig. 14, but with the segment in a different position and in horizontal central section;

Fig. 16 is an enlarged detail in section on the line 16—16 of Fig. 14;

Fig. 17 is a similar view in section on the line 17—17 of Fig. 16;

Fig. 18 is an end view of the mechanism for adjusting the fulcrum of the operating lever of the die-emptying device; and Fig. 19 is a view as seen in section on the line 19—19 of Fig. 18.

I have shown my improvements as applied to a well known type of press for cutting envelop-blanks, the general construction of the press being shown in Figs. 1, 2 and 3, where it will be seen to be made up of two side pieces 20 and 21 connected at the top by a cross piece 22 and at the center by the transverse casting 23, which serves as a bed-plate for the press. These side pieces are also connected at the bottom by the transverse rods 24 and 25. The side pieces 20 and 21 are provided with the vertical walls 26 in which reciprocates the plunger 27, which is driven by any suitable motor and gearing, such for instance as the electric motor 28 mounted on the top of the frame piece 22 and having a belt pulley 29 on its armature shaft connected by a belt 30 with the belt-wheel 31 secured on the driving shaft 32 journaled in suitable bearings supported by the framework, and carrying at the other end the fly wheel 33. The driving shaft 32 has loosely mounted thereon the hollow clutch disk 34, which has coöperating therewith the expanding clutch members 35 mounted to rotate with the shaft 32, and moved to clutching position by the cone 36 coöperating with the fingers 37. The cone 36 is connected to the collar 38 splined on the shaft 32 and having its groove entered by the operating fingers or rollers on the ends of the yoke 39 secured on the rock shaft 40 journaled in suitable bearings supported by the frame, and having at its forward end a crank arm 41 connected by the link 42 with the operating handle 43 mounted on the rock shaft 44 by connections to be subsequently described, so that as the handle 43, as seen in Fig. 2, is swung to the left, the shaft 40 will be rocked to shift the cone 36 to engage the clutch and cause the clutch disk 34 to be coupled to the shaft 32. This disk 34 has secured on its hub a spur gear wheel 45, which meshes with a spur gear wheel 46 secured on a horizontal countershaft 47 journaled in suitable bearings in the framework and having secured thereon the spur gear pinion 48, which meshes with the spur gear wheel 49 secured on the driven shaft 50, which is journaled in suitable bearings in the frame, and has on its ends the eccentrics 51, which are connected by suitable links 52 with the bearing studs 53 on the ends of the plunger 27, so that at each rotation of the driven shaft 50, the plunger 27 will be raised and lowered by a continuous movement a sufficient distance to force the die 54, placed on the stock 55 resting on the table 56, which in turn rests on the bed plate 23, through the stock 55. The rotation of the operating shaft 50 is started by operating the handle 43 as already described, and toward the end of the complete rotation of the shaft 50, a cam lug 57 secured on the adjacent face of the spur gear wheel 49 engages the roller 58 carried by the thrust bar 59 supported by the link 60 pivoted to the under side of the bed-plate frame, and also by the crank arm 61 secured to the rock shaft 40, so that the movement of the thrust arm 59 by the cam 57, operating through the rock shaft 40, the crank arm 41 and the link 42, automatically throws the operating handle 43 back to its unoperated position, and at the same time disengages the clutch to stop the shaft 50 when it has made a complete rotation. The table 56 is supported so as to be readily moved from the loading position shown in Fig. 3 to cutting position on the bed-plate 23, and back, by being supported on the eight anti-friction rollers 62 shown as journaled on the brackets 63 secured to and projecting forwardly from the bed-plate casting 23. These rollers are journaled on four rods 64 supported in said brackets 63, and in an intermediate bracket 65 similarly supported. A handle 66 is connected to the forward end of the table 56, and, in the ordinary operation of the press thus far described, the table is moved in and out manually by gripping the handle 66.

It will be understood that the press as thus far described is old and well known, and, *per se*, constitutes no part of my invention. The first part of said invention resides in the providing of means whereby the table 56 will be automatically drawn out to its loading position as soon as the plunger 27 has reached the limit of its downward movement and the die 54 has been forced thereby through the stock 55 so that its cutting edge engages the top of the table 56. To this end, I employ the connections and mechanism best shown in Figs. 1, 2, 3, and 14 to 17, inclusive, where it will be seen that the spur gear wheel 49 on the driven shaft 50 has bolted to its spokes a friction segment 67 of the shape in cross section seen in Fig. 15, and extending through substantially one hundred and eighty degrees. The operating flange 68 of this segment has secured on its periphery a strip of fiber or rawhide 69 forming a friction surface to engage the periphery of the annular friction flange 70 which projects outwardly from the rim of the friction sheave 71, which is journaled on the shaft 72 mounted in the bearings 73 formed on the upper ends of the bearing bars 74 having the hubs 75 on the lower ends thereof supported on the shaft 25 and held in place against the frame 21 by the spacing sleeve 76 interposed on said shaft 25 between the frame 20 and the adjacent hub 75. The upper ends of these bearing bars 74 are provided with anchoring rods 77 and 78 having their lower ends secured thereto, and their upper ends secured, respectively, to the side piece 21 and to the under side of the bed-plate 23, as seen in Figs. 2 and 3, respectively. The sheave 71 has secured to one of its spokes the end of a rope or cable 79 passed through an aperture 80 in the rim of the sheave so as to be wound in the groove thereof, and the cable 79 passes over the direction pulley 81, suitably journaled on the bracket 82 extending forward from the outer end of the bracket 63, and the other end of the cable 79 is secured to the outer end of the table 56. A second rope or cable 83 is secured at its inner end to a certain portion of the friction flange 70, while its free end is attached to a weight 84, located below the floor on which the press rests, and the cable 83 is guided over the direction pulley 85 on the floor adjacent the aperture through which the cable 83 passes. The flange 70 has secured thereto a stop lug 86, which has threaded through one end thereof the abutment 87, the end of which engages the adjacent bearing bar 74 when the friction sheave 71 is brought to its normal position by the pull of the weight 84, the threaded abutment 87 being provided so that the position of the sheave 71 can be determined with the necessary accuracy.

The operation of this mechanism can now be explained as follows: When the machine is at rest, the parts occupy the position shown in Fig. 14, and when the press is started by manipulating the handle 43, the spur gear wheel 49 rotates in the direction indicated by the arrow in Fig. 14, and during the first half of its complete rotation, while the plunger 27 is descending and the die 54 is being forced through the stock 55, the segment 67 does not engage the friction flange 70, but at the end of the downward movement of the plunger 27, the rawhide strip 69 on the flange 68 engages the flange 70 and rotates the sheave 71 in the direction shown by the arrow in Fig. 14, winding the cable 79 on the sheave 71. This movement does not affect the table 56 until the slack is taken up, the amount of slack depending upon the position of the table 56, which of course varies with the position of the die 54 on the stock 55. After the slack is taken up, the pull of the cable 79 automatically pulls the table 56 out to its loading position, where the operator lifts off the filled die 54 by hand and puts it on the support 113 to be described and places a similar empty die on a fresh place on the stock, after which the operation is repeated, and so on, until the stock 55 on the table 56 has all been cut up, after which fresh stock has to be supplied. As soon as the strip 69 is disengaged from the flange 70 by its continued rotation, always in the same direction, the weight 84 acting through the cord 83 rotates the sheave 71 and flange 70 back to its idle position, shown in Figs. 1 and 14, ready for another operation, and this backward rotation winds off the cable 79 from the sheave 71, producing the slack in the cable shown in Figs. 1 and 3.

The second feature of my invention resides in the employment of the die-emptying mechanism, by which the filled die 54 on the support 113 is automatically emptied by the movement of the lever 43 to its starting position. For this purpose, I employ the mechanism best shown in Figs. 1, 2, and 4 to 13, inclusive, where it will be seen that adjacent to the framework of the press, I locate the hollow rectangular base 88, which is provided with the four upwardly projecting corner posts 89, which are connected along the length of the frame by the pair of inclined side pieces 90 on the inside of the posts. The two outer, and preferably shorter, posts 89 are connected by the inclined cross piece 91, which has secured to its higher edge the inclined cross piece 92, which connects the side pieces 90. On the flange 93 at the bottom of this cross piece 92 is secured the angle iron 94, which is bent into the necessary angular shape to form a support for that end of the preferably metallic trough 95, the preferred shape of which in cross section is shown in Fig. 7. I preferably employ two of these troughs 95, and their upper ends are supported upon angle-iron supports 96, similar to 94, and secured on the outer face of the inclined wooden face-plate 97, the shape of which is seen in Figs. 6 and 7, and which is supported at its ends by being secured to the properly inclined upper end of the adjacent posts 89. The troughs 95, being symmetrical throughout, can obviously be reversed and either end rest on the respective angle-iron supports 94 and 96, the middle parts of the troughs being preferably supported by the wooden cross-piece 98 having suitably shaped notches in the upper face thereof, which in turn is supported by the generally U-shaped metallic strap 99 having its upper ends secured to the sides of the side pieces 90. The troughs 95 are each provided with a follower 100, the details of which are best seen in Figs. 4 and 7, where the main portion thereof will be seen to be formed of the flat metallic strip 101 bent into the general shape of an oval open at the bottom, and with its ends riveted to the horizontal metallic strip 102, the ends 103 of which are turned back upon the under side and drawn up against the resilient friction block 104 by the set screw 105 passing through an aperture in the body of the plate 102, and threaded into the end 103. The friction blocks 104 engage the under side of the flanges 106 projecting from the edges of the troughs 95, so that the followers 100 may be adjusted to slide along the troughs in the position shown in Fig. 4, with just the desired amount of resistance. At the under side of the portion 102 is riveted the metallic strip 107, which is of the shape shown, and which coöperates with the lower portion of the envelop-blank 108, the design of which is shown in Fig. 5. The hollow body of the follower formed by the strips 101 and 102 is closed on both faces by the metallic strips 109 and 110, the shape of which is apparent from Figs. 4 and 7, and which are riveted to each other at their points of intersection, and also to the strip 101 where they cross it, and at their ends to the strip 102. By this means, I have produced a light follower which can be shoved along the trough as additional envelops are forced into it at the receiving end. The face plate 97 is provided with apertures 111, which are of the general shape of the envelop-blank 108, and of a size to accommodate the largest envelop of that design that is to be cut. The lower portion of the aperture is lined by the polished steel strip 112, and projecting forwardly from the bottom of the face plate 97 are the angular wooden pieces 113, which, as best seen at the left hand of Fig. 6, form the support for the filled die 54. The inner face of the lower portion of the die registers exactly with the face of the metallic strip 112, so that the envelop blanks 108 can be readily pushed from the die, over the plate 97 and into the trough 95. The top of the die 54 is accurately supported, irrespective of its size, by the adjustable bars 114, which have the slots 115 therethrough, through which pass the set screws 116, which pass through holes in the face plate 97 and have the wing nuts 117 on their threaded ends, by which the heads of the bolts can be drawn against the edges of the slots to secure the bars 114 in the precise adjustment desired so as to cooperate with the cutting edge of the top of the die 54 without interfering with the passage of the envelop-blanks therefrom.

Passed through side bars of the frame 88 is a rod 118 upon which is fulcrumed the lower end of an elongated rectangular frame made up of the two side angle-bars 119, the lower end angle-bar 120, and the top angle-bar 121, all suitably riveted together. The side bars 119 extend up beyond the end or cross bar 121, and are provided at their upper ends with the bearings 122 for the shaft 44, which is mounted to rock therein, and has a bearing bracket 123 secured on the outer end thereof to receive the lower end of the operating lever 43. Secured on the shaft 44 opposite the center of each of the apertures 111 is the pusher arm or lever 124, which is of the shape best shown in Figs. 2 and 10, and is provided at its upper end with the head 125, which passes through the center of the die 54 in place on the support 113 and when the shaft 44 is rocked by the handle, and pushes the cut blanks into the trough. At the same time that the pusher 125 is moved forward to discharge the cut blanks, the shaft 44 is rocked, and the crank arm 126 secured on the other end of the shaft has its pin 127 projecting from the side thereof engage the side of the crank arm 128 which has the link or thrust bar 42 pivoted to the lower end thereof, so that said thrust bar 42 is forced inward to start the machine. At the end of the cycle of movement of the machine, it will be remembered that the cam 57 engaging the roller 58 shoves the bar 59 to the left, thereby thrusting the bar 42 back to its normal position, and this movement, through the engagement of the crank arm 128 with the pin 127, also rocks the shaft 44 to carry it back to its normal inoperative position.

In addition to the mechanism thus far described, which provides for the emptying of the filled die 54 placed on the supports 113, I preferably associate therewith mechanism by which the die 54 which has just been emptied is lifted off of the supports 113 and carried over toward the machine and deposited on the ends of the pair of supports 129, which, as best seen in Figs. 4 and 6, have their ends approaching the wooden rests 130, the design of which is seen in Fig. 9, which are supported from the face plate 97 by the iron straps 131 secured to the back thereof and having their lower ends secured to the bottom of the plate 97. For this purpose, I provide the generally bell-crank-shaped handle 132 pivoted at 133 near the top of the hand lever 43, so that when the same is grasped to return it, the handle 132 can be moved toward the handle of the hand lever 43. Pivoted to the other end of the handle 132 is the link 134, which has its lower end connected to the crank arm 135, which is secured on the adjacent end of the rock shaft 136 journaled in an arm 137 of the adjacent bearing 122, and having its other end journaled in a bearing, not shown, loosely mounted on the shaft 44. A collar 138 secured on the shaft 136 has one end of a helically-coiled torsional spring 139 secured thereto, while the other end of the spring is secured to the arm 137, so that the spring will return the shaft to its normal position as soon as the handle 132 is released. Adjacent the two arms 124, the shaft 136 has secured thereon the crank arms 140, which are provided with the pins 141 entering the slots 142 in the lower ends of the levers 143 pivoted at 144 to the arms 124. The shape of the levers 143 is indicated in Figs. 9 and 10, and secured on the upper ends of said levers is the fork 145 back of the head 125, and the upper end of the fork is provided with the pads 146, which are adapted to engage the under side of the upper portion of the die 54 and lift the same off of the seat 113 as soon as the handle 132 is operated. The handle 132 is kept in its operated position until the handle 43 is swung back to its normal position, and during this movement the empty die 54 is lifted and carried over into engagement with the pieces 130 and deposited on the ends of the projection 129, where it is handy for the operator to lift it off and place it on the stock wherever it is needed. To limit the backward movement of the levers 124 and 143, I secure on the rock shaft 44 the arm 147, seen in Figs. 4 and 12, which engages the under side of the cross piece 121.

To raise and lower the rock shaft 43 so that the head 125 will always pass through the center of the die 54, irrespective of its size, I provide the means best shown in Figs. 4, 18 and 19, where it will be seen that the two sides 119 of the frame in which the rock shaft 44 is journaled are each provided with a chain 148 secured at its lower end thereto, and having its upper end secured on the adjacent sheave 149 secured on the shaft 150 journaled in suitable bearings in the posts 89, and having at the forward end of the machine the hand wheel 151 by which the shaft is turned to raise or lower the frame, and consequently the shaft 44. To retain it in the position of adjustment, I secure on the shaft 151 the ratchet disk 152, and coöperating therewith is the detent pawl 153 held to its work by the leaf spring 154.

While I have herein shown and described in detail my novel die emptying device, I do not herein claim the same *per se*, as it is so claimed in my divisional application No. 218,937, filed February 25, 1918.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new and desire to secure by Letters Patent of the United States, is:

1. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing permitting said table to be otherwise moved from its loading position to any desired cutting position.

2. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, and intermittent gearing between the driven shaft and the rocking member set for engagement when the plunger reaches the limit of its downward movement.

3. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, intermittent gearing between the driven shaft and the rocking member set for engagement when the plunger reaches the limit of its downward movement, and means for returning the rocking member to its normal position as soon as it is disengaged from the intermittent gearing without thereby moving the table.

4. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, intermittent gearing between the driven shaft and the rocking member set for engagement when the plunger reaches the limit of its downward movement, and a cable between the table and the rocking member wound on the latter as it is rocked by the intermittent gearing.

5. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, intermittent gearing between the driven shaft and the rocking member set for engagement when the plunger reaches the limit of its downward movement, a drum on said rocking member, a flexible member connected thereto at one end and wound thereon as the table is moved outward, and a weight connected to the other end of said flexible member.

6. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, intermittent gearing between the driven shaft and the rocking member set for engagement when the plunger reaches the limit of its downward movement, a cable between the table and the rocking member wound on the latter as it is rocked by the intermittent gearing, a drum on said rocking member, a flexible member connected thereto at one end and wound thereon as the table is moved outward, and a weight connected to the other end of said flexible member.

7. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, a semicircular friction disk on the driven shaft, a rocking sheave having an annular frictional periphery in the plane of the friction disk, and a cable connected at one end to the sheave and wound thereon as it is rotated by the friction disk, and connected at the other end to the table.

8. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, a semicircular friction disk on the driven shaft, a rocking sheave having an annular frictional periphery in the plane of the friction disk, a cable connected at one end to the sheave and wound thereon as it is rotated by the friction disk, and connected at the other end to the table, and means for automatically rotating the sheave back to normal position when released from the friction disk.

9. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, a semicircular friction disk on the driven shaft, a rocking sheave having an annular frictional periphery in the plane of the friction disk, a cable connected at one end to the sheave and wound thereon as it is rotated by the friction disk, and connected at the other end to the table, and means for automatically rotating the sheave back to normal position when released from the friction disk, said means consisting of a drum on the rocking sheave, a flexible member connected thereto at one end and wound thereon as the table is moved outward, and a weight connected to the other end of said flexible member.

10. In an apparatus of the class described, the combination with a frame, of a plunger adapted to reciprocate vertically therein, a horizontally movable table mounted on said frame, and gearing for reciprocating said plunger and automatically moving the table to its loading position as the plunger rises, said gearing consisting of a continuously rotating driving shaft, a driven shaft, connections from the driven shaft to the plunger for reciprocating the latter at each rotation of said driven shaft, connections between the driving and the driven shaft including a clutch engaged manually and disengaged automatically after one revolution of the driven shaft, a rocking member connected to the table to move it in one direction, a semicircular friction disk on the driven shaft, a rocking sheave having an annular frictional periphery in the plane of the friction disk, a cable connected at one end to the sheave and wound thereon as it is rotated by the friction disk, and connected at the other end to the table, means for automatically rotating the sheave back to normal position when released from the friction disk, and an adjustable stop to determine said normal position.

11. In an apparatus of the class described, the combination with a frame, of a plunger adapted to reciprocate vertically therein, a horizontally movable table mounted on said frame and movable to be stopped in any desired position relative to the plunger, gearing for reciprocating said plunger and moving the table back to its loading position, a receptacle for the cut blanks, a filled-die holder, a member for pushing cut blanks from a filled die in place on the holder into said receptacle, and a single common member for operating the pusher and starting the gearing by the movement of said member.

12. In an apparatus of the class described, the combination with a frame, of a plunger adapted to reciprocate vertically therein, a horizontally movable table mounted on said frame and movable to be stopped in any desired position relative to the plunger, gearing for reciprocating said plunger and moving the table back to its loading position, a receptacle for the cut blanks, a filled-die holder, a member for pushing cut blanks from a filled die in place on the holder into said receptacle, and means operated by the gearing for moving the pusher in one direction.

13. In an apparatus of the class described, the combination with a frame, of a plunger adapted to reciprocate vertically therein, a horizontally movable table mounted on said frame and movable to be stopped in any desired position relative to the plunger, gearing for reciprocating said plunger and moving the table back to its loading position, a receptacle for the cut blanks, a filled-die holder, a member for pushing cut blanks from a filled die in place on the holder into said receptacle, a single common member for operating the pusher and starting the gearing by the movement of said member, and connections between said gearing and said member for returning the pusher to its idle position.

14. In an apparatus of the class described, the combination with a frame, of a plunger adapted to reciprocate vertically therein, a horizontally movable table mounted on said frame and movable to be stopped in any desired position relative to the plunger, gearing for reciprocating said plunger and moving the table back to its loading position, a receptacle for the cut blanks, a filled-die holder, a member for pushing cut blanks from a filled die in place on the holder into said receptacle, and a single hand lever for operating the pusher, starting the gearing and lifting the empty die off of its holder.

15. In an apparatus of the class described, the combination with a frame, of a plunger adapted to reciprocate vertically therein, a horizontally movable table mounted on said frame and movable to be stopped in any desired position relative to the plunger, and gearing for reciprocating said plunger and automatically moving the table back to its loading position.

In witness whereof I have hereunto set my hand and affixed my seal, this 19th day of Sept., A. D. 1917.

LE ROY B. FRASER. [L. S.]